(12) United States Patent
Guminy et al.

(10) Patent No.: US 10,348,588 B2
(45) Date of Patent: Jul. 9, 2019

(54) DYNAMIC MANAGEMENT OF INTEGRATION PROTOCOLS

(71) Applicant: International Business Machines Corporation, Armonk, NY (US)

(72) Inventors: Scott M. Guminy, Newmarket (CA); Leho Nigul, Richmond Hill (CA); Kevin Yu, Unionville (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 152 days.

(21) Appl. No.: 14/895,251

(22) PCT Filed: May 15, 2014

(86) PCT No.: PCT/CA2014/050458
§ 371 (c)(1),
(2) Date: Dec. 2, 2015

(87) PCT Pub. No.: WO2014/201553
PCT Pub. Date: Dec. 24, 2014

(65) Prior Publication Data
US 2016/0127212 A1    May 5, 2016

(30) Foreign Application Priority Data
Jun. 21, 2013  (CA) .................................... 2819539

(51) Int. Cl.
*G06F 15/173* (2006.01)
*H04L 12/26* (2006.01)
(Continued)

(52) U.S. Cl.
CPC .......... *H04L 43/08* (2013.01); *G06F 11/3433* (2013.01); *G06F 11/3495* (2013.01);
(Continued)

(58) Field of Classification Search
CPC . H04L 43/08; H04L 41/5009; H04L 41/5025; H04L 41/5096; H04L 45/70; G06F 11/3433; G06F 11/3495
See application file for complete search history.

(56) References Cited

U.S. PATENT DOCUMENTS 6,618,378 B1 *  9/2003  Giroux ................ H04L 12/5601
                                                               370/235
6,738,975 B1    5/2004  Yee et al.
(Continued)

FOREIGN PATENT DOCUMENTS

CA    2791771 A1    4/2014
CN    1620781 A     5/2005
(Continued)

OTHER PUBLICATIONS

Andreas Ohlund, "Limits on message size and why it might be a problem for you", Jan. 18 2011, http://andreasohlund.net/2011/01/18/limits-on-message-size-and-why-it-might-be-a-problem-for-you/ (pulled on Oct. 18, 2018), pp. 1-4 (Year: 2011).*
(Continued)

*Primary Examiner* — Jonathan A Bui
(74) *Attorney, Agent, or Firm* — Erik K. Johnson (57) ABSTRACT

An illustrative embodiment of a computer-implemented process for dynamic management of integration protocols connects a set of applications to a communication fabric to form a set of connections, which are monitored to collect a set of performance metrics. In response to a determination the predetermined performance metric is not within the predetermined tolerance associated with the particular application in the set of applications an integration path in the set of connections for the particular application in the set of
(Continued)

applications is adjusted by programmatically using a set of rules wherein each rule in the set of rules is a performance driven rule.

20 Claims, 7 Drawing Sheets (51) Int. Cl.
*G06F 11/34* (2006.01)
*H04L 12/24* (2006.01)
*H04L 12/721* (2013.01)

(52) U.S. Cl.
CPC ...... *H04L 41/5009* (2013.01); *H04L 41/5025* (2013.01); *H04L 41/5096* (2013.01); *H04L 45/70* (2013.01)

(56) References Cited

U.S. PATENT DOCUMENTS

| | | | | |
|---|---|---|---|---|
| 7,275,103 | B1* | 9/2007 | Thrasher | H04L 45/22 709/223 |
| 7,404,185 | B2 | 7/2008 | Zhang et al. | |
| 7,454,399 | B2 | 11/2008 | Matichuk | |
| 7,496,661 | B1* | 2/2009 | Morford | H04L 41/5025 709/224 |
| 7,644,184 | B2 | 1/2010 | Arora et al. | |
| 7,773,622 | B2* | 8/2010 | Schmidt | H04L 49/30 370/231 |
| 7,843,843 | B1* | 11/2010 | Papp, III | H04L 41/5009 370/252 |
| 8,095,497 | B2 | 1/2012 | O'Brien et al. | |
| 9,077,758 | B1* | 7/2015 | McGovern | H04L 63/14 |
| 9,654,383 | B2* | 5/2017 | Babiarz | H04L 45/22 |
| 2003/0026205 | A1* | 2/2003 | Mullendore | H04L 47/29 370/230 |
| 2003/0093402 | A1 | 5/2003 | Upton | |
| 2007/0041326 | A1* | 2/2007 | Babiarz | H04L 41/5022 370/237 |
| 2007/0047446 | A1* | 3/2007 | Dalal | H04L 45/02 370/237 |
| 2009/0031306 | A1* | 1/2009 | Yuen | H04L 49/90 718/100 |
| 2009/0248917 | A1* | 10/2009 | Kalos | G06F 3/061 710/39 |
| 2009/0320073 | A1 | 12/2009 | Reisman | |
| 2010/0031366 | A1* | 2/2010 | Knight | G06Q 10/10 726/26 |
| 2010/0115059 | A1* | 5/2010 | Youill | G07F 17/32 709/219 |
| 2011/0231848 | A1* | 9/2011 | Long | G06F 9/546 718/101 |
| 2012/0233342 | A1* | 9/2012 | Queru | H04L 67/06 709/228 |
| 2013/0074129 | A1 | 3/2013 | Reisman | |
| 2013/0329560 | A1* | 12/2013 | Shomura | H04W 28/0247 370/235 |
| 2014/0064292 | A1* | 3/2014 | Binetti | H04L 41/0668 370/412 |
| 2014/0139537 | A1* | 5/2014 | Ghosh | G06F 3/14 345/547 |

FOREIGN PATENT DOCUMENTS

| | | |
|---|---|---|
| CN | 101981539 A | 2/2011 |
| CN | 102460391 A | 5/2012 |
| CN | 105340219 A | 2/2017 |
| GB | 2529601 B | 8/2016 |
| JP | H09289531 A | 11/1997 |
| JP | 2005027304 A | 1/2005 |
| JP | 2009075718 A | 4/2009 |
| JP | 2016524879 A | 8/2016 |
| WO | 0239351 A2 | 5/2002 |
| WO | 2014201553 A1 | 12/2014 |

OTHER PUBLICATIONS

Kwak et al., "A Framework Supporting Dynamic Workflow Interoperation and Enterprise Application Integration," Proceedings of the 35th Hawaii International Conference on System Sciences, 2002, pp. 1-10.

Parris et al., "The Dynamic Management of Guaranteed Performance Connections in Packet Switched Integrated Service Networks," The Tenet Group, Computer Science Division, University of California, Berkeley and International Computer Science Institute, Dec. 1994 (Dec. 1994), UCB Technical Report CSD-94-859, pp. 1-145.

International Search Report, International Application No. PCT/CA2014/050458, International Filing Date: May 15, 2014, Date of the International Search Report: Jul. 3, 2014, dated Jul. 18, 2014, pp. 1-3.

Written Opinion of the International Searching Authority, International Application No. PCT/CA2014/050458, International Filing Date: May 15, 2014, dated Jul. 18, 2014, Date of completion of this opinion: Jul. 17, 2014, pp. 1-4.

* cited by examiner

DYNAMIC MANAGEMENT OF INTEGRATION PROTOCOLS

BACKGROUND

This disclosure relates generally to application integration in a data processing system and more specifically to dynamic management of integration protocols in the data processing system.

Applications or application components often communicate with other applications or components to retrieve and process associated data. For example, an application used for electronic commerce communicates with a search appliance to retrieve catalog search data and also an order management system to store orders. A pattern of granular interconnected services has evolved and become more pervasive with increased use of software as a service (SaaS) and deployment of applications using the cloud based computing techniques.

A typical problem evident with using this pattern is overall performance of the particular type of integrated system is typically dependent upon the weakest link in the system. Accordingly when one component is overloaded, fails or performs badly, the whole integrated system suffers.

SUMMARY

According to one embodiment, a computer-implemented process for dynamic management of integration protocols comprises connecting, by one or more processors executing computer executable program code stored within a memory connected to the one or more processors, a set of applications to a communication fabric to form a set of connections and monitoring the set of connections, by the one or more processors, to collect a set of performance metrics associated with the set of connections.

The computer-implemented process further determines, by the one or more processors, whether a predetermined performance metric is within a predetermined tolerance associated with a particular application in the set of applications. In response to a determination the predetermined performance metric is not within the predetermined tolerance associated with the particular application in the set of applications, by the one or more processors, adjusting an integration path in the set of connections for the particular application in the set of applications by programmatically using a set of rules wherein each rule in the set of rules is a performance driven rule.

According to another embodiment, a computer program product for dynamic management of integration protocols comprises a computer recordable data storage device containing computer executable program code stored thereon. The computer executable program code comprises computer executable program code for connecting a set of applications to a communication fabric to form a set of connections and computer executable program code for monitoring the set of connections to collect a set of performance metrics associated with the set of connections. The computer program product further comprises computer executable program code for determining, by the one or more processors, whether a predetermined performance metric is within a predetermined tolerance associated with a particular application in the set of applications; and computer executable program code in response to a determination the predetermined performance metric is not within the predetermined tolerance associated with the particular application in the set of applications for adjusting an integration path in the set of connections for the particular application in the set of applications by programmatically using a set of rules wherein each rule in the set of rules is a performance driven rule.

According to another embodiment, an apparatus for dynamic management of integration protocols comprises a communications fabric; a memory connected to the communications fabric, wherein the memory contains computer executable program code; a communications unit connected to the communications fabric; an input/output unit connected to the communications fabric; a display connected to the communications fabric; and a processor unit connected to the communications fabric. The processor unit executes the computer executable program code to direct the apparatus to connect a set of applications to a communication fabric to form a set of connections and to monitor the set of connections to collect a set of performance metrics associated with the set of connections.

The processor unit further executes the computer executable program code to direct the apparatus to determine whether a predetermined performance metric is within a predetermined tolerance associated with a particular application in the set of applications; and in response to a determination the predetermined performance metric is not within the predetermined tolerance associated with the particular application in the set of applications, adjust an integration path in the set of connections for the particular application in the set of applications by programmatically using a set of rules wherein each rule in the set of rules is a performance driven rule.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing, but does not encompass propagation media. More specific examples (a non-exhaustive list) of the computer-readable data storage devices would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device or any suitable combination of the foregoing, but does not encompass propagation media. In the context of this document, a computer-readable data storage device may be any tangible device that can store a program for use by or in connection with an instruction execution system, apparatus, or device.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle Corporation, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage device that can direct a computer or other programmable data processing apparatus to function in a particular manner, such that the instructions stored in the computer readable data storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
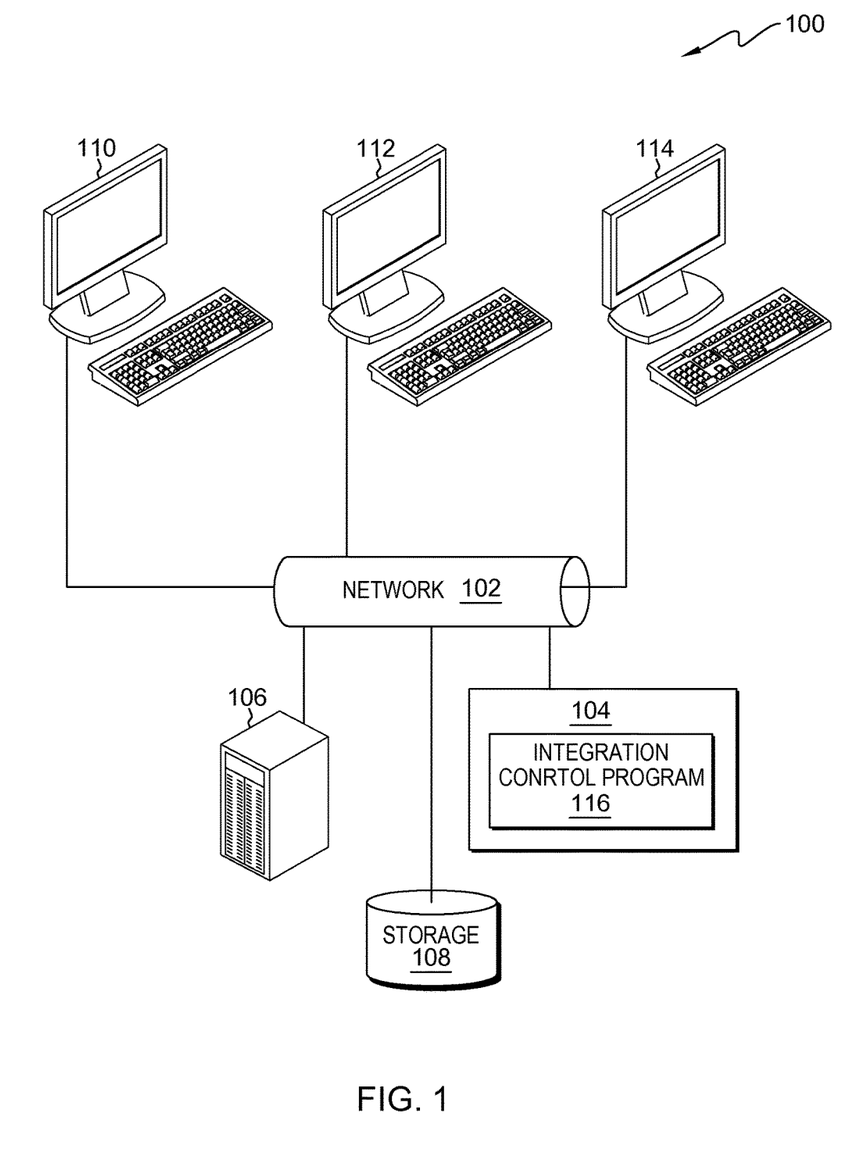
FIG. 1 is a block diagram of an exemplary network data processing system operable for various embodiments of the disclosure.
Figure 2:
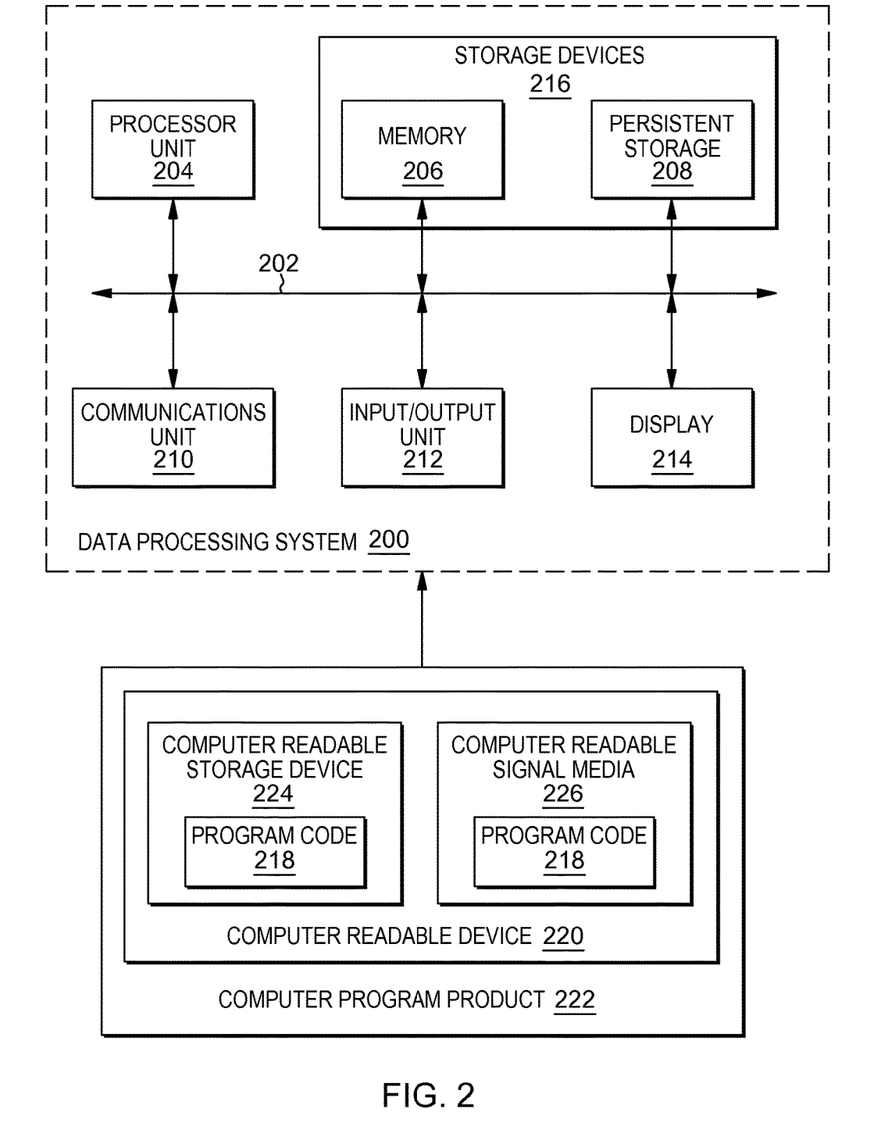
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, an embodiment of integration control program 116 and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, integration control program 116 of FIG. 1, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218, which in one embodiment comprises integration control program 116 of FIG. 1, is located in a functional form on computer readable storage media such as computer readable device 220 that is selectively removable and may be loaded onto or transferred to data processing system 200 for execution by processor unit 204. Program code 218 and computer readable storage device 220 form computer program product 222 in these examples. In one example, computer readable storage device 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage device 220 also may take the form of a persistent storage, such as a hard drive, a thumb drive, or a flash memory that is connected to data processing system 200. The tangible form of computer readable storage device 220 is also referred to as computer recordable storage media or a computer readable data storage device. In some instances, computer readable storage device 220 may not be removable.

Alternatively, program code 218 may be transferred to data processing system 200 from computer readable storage device 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for dynamic management of integration protocols is presented. Processor unit 204 executes computer executable program code, comprising integration control program 116 of FIG. 1, stored within memory 206 connected to one or more processors of processor unit 204 for connecting a set of applications to a communication fabric to form a set of connections and for monitoring the set of connections to collect a set of performance metrics associated with the set of connections.

Processor unit 204 further executes computer executable program code stored within memory 206 connected to the one or more processors of processor unit 204 for determining whether a predetermined performance metric is within a predetermined tolerance associated with a particular application in the set of applications. In response to a determination the predetermined performance metric is not within the predetermined tolerance associated with the particular application in the set of applications, processor unit 204 adjusts an integration path in the set of connections for the particular application in the set of applications by programmatically using a set of rules wherein each rule in the set of rules is a performance driven rule.

Figure 3:
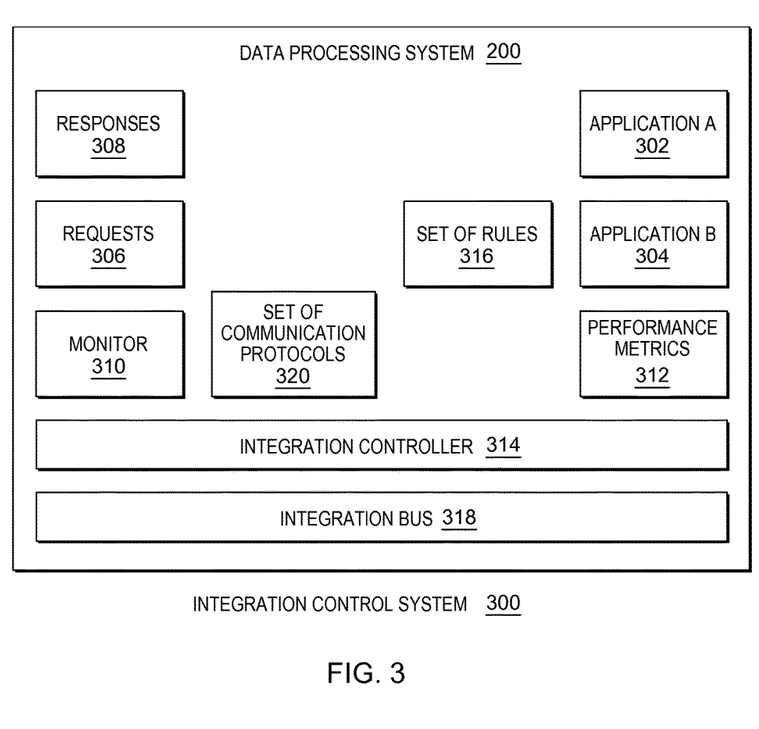
FIG. 3 is a block diagram representation of an integration control system operable for various embodiments of the disclosure.

With reference to FIG. 3 a block diagram representation of an integration control system operable for various embodiments of the disclosure is presented. Integration control system 300 is an example of a system or apparatus for automatic management of system integration protocols and channels using performance characteristics and characteristics of actual integrated content to control selection of integration protocols and channels during run time in real time. Real time, in the context of the disclosure, is an approximation of a relatively short period of time as opposed to a time period measured in hours, days, weeks or months.

Integration control system 300 provides a capability to define the service and quality of service for requests 306 an application, for example application A 302 or application B 304 needs to process and linking performance metrics 312 to specific communication protocols and integration channels in a set of communication protocols 320 used to integrate the application with other parts of the data processing system. Specific communication protocols and integration channels may also be referred to as paths or routes. Applications communicate with each other, in the current example, using a correspondence of requests 306 and responses 308 in a form of conversational exchange.

Different applications (or components of the applications) such as application A 302 and application B 304 in the current example connect to each other through integration bus 318. Integration bus 318 provides a form of communication fabric enabling communication among a variety of applications (or components of the applications). For each individual connection, a predefined set of integration paths from set of communication protocols 320 is defined within integration bus 318. Each connection has a default integration path. Integration controller 314 instructs which of the available predetermined integration paths should be taken using one or more of a predefined set of rules 316.

A rule is typically defined as one or more conditions which when met trigger a particular action. For example a rule comprising one or more conditions and one or more actions may be defined as if number of requests to component A exceeds 100,000—take "batch send" integration path for communicating with Component A for 2 hours. When the specified condition happens, the corresponding action of taking the specified integration path in integration bus 318. Rather than flooding component A with synchronous requests, the communication protocol is selected to a batch mode for the specific amount of time to alleviate stress on the component. One or more rules may also be executed in a combination to achieve a particular result.

Integration controller 314 provides a capability of aggregating a number of functions including serving as a pluggable repository for performance metric driven rules, for example, set of rules 316, a controller for integration path selection and a pluggable repository for measurement plugins, to measure by monitor 310 performance metrics 312 which are not originally supported out of the box by an implementation of an embodiment of the disclosure.

Integration control system 300 can be leveraged to use different integration paths at the same time, based on certain additional properties of the data being routed. For example, an e-commerce site sells both highly time-sensitive items and not very time sensitive items, using a predetermined rule to route most of the requests to a wait batch queue, but will also permit some requests through, using time-sensitivity of the associated data as a trigger characteristic.

Figure 4:
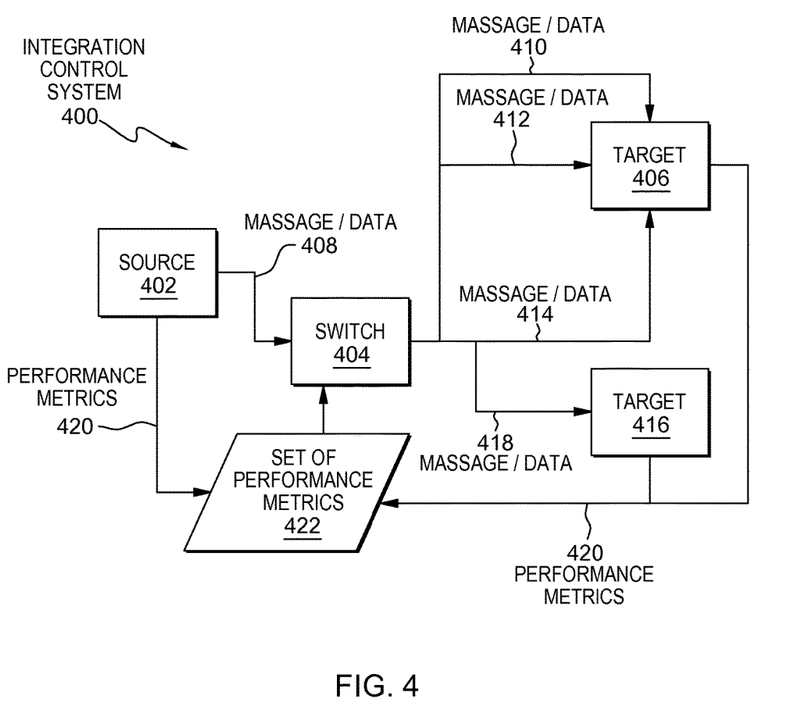
FIG. 4 is a block diagram of an embodiment using the integration control system of FIG. 3 in accordance with one embodiment of the disclosure.

With reference to FIG. 4 a block diagram of an embodiment using the integration control system of FIG. 3 in accordance with one embodiment of the disclosure is presented. Integration control system 400 is a variant of integration control system 300 of FIG. 3, in which a simplified view of switch 404 is used to represent the functional capability of integration controller 314 and integration bus 318 is depicted.

Source 402 represents a set of one or more applications or a set of one or more components of applications, which need to communicate with another set of one or more applications, or another set of one or more components of applications. In some cases a set of one or more applications or a set of one or more components of applications may need to communicate with a same set of one or more applications, or a same set of one or more components of applications.

Integration control system 400 (and integration control system 300) differ from previous attempted solutions because performance based metrics are used to choose between different available communication frameworks (protocols and channels) depending on real time measured data and availability parameters. The type of service, as disclosed, is suited to service based/cloud models, which are governed by specific service level agreements because of the programmatic management in the form of dynamic selection of communication frameworks and destinations (protocols and channels) using performance metrics 420 saved for subsequent use as set of performance metrics 422. Set of performance metrics 422 can be cached to provide enhanced performance during protocol selection activity.

The dynamic selections also imply actually switching, by switch 404, the communication protocols based on performance metrics 420 in the form of set of performance metrics 422. Switch 404 uses a respective one of message/data 408 message/data 410 message/data 412 and message/data 414 to communicate with source 402 and either target 406 or target 416.

Using the example of FIG. 3, an e-commerce site sells both highly time-sensitive items and not very time sensitive items. Using a particular predetermined rule, switch 404 routes most of the requests from source 402 to a wait batch queue, using a route or path of message/data 410. The wait batch queue functions as a buffer to capture requests until a time is reached for further processing. At the same time switch 404 also permits some of the requests through, using time-sensitivity of the associated data as a trigger characteristic using a route or path of message/data 412. In another variation using a particular predetermined rule, switch 404 also routes a portion of the requests from source 402 to a wait batch queue, using a route or path of message/data 410. However in this case, at the same time switch 404 also permits some of the requests through, using time-sensitivity of the associated data as a trigger characteristic using a route or path of message/data 418 to a second target in the form of target 416.

In the example just described a capability is provided to avoid an overload and potential failure of target 406 using in one instance a queue management technique of holding requests in a wait batch queue until target 406 can handle the load. In another instance a portion of the load is shifted to another target as in target 416. The selection of which route or path to use is managed dynamically by switch 404 using set of performance metrics 422.

Figure 5:
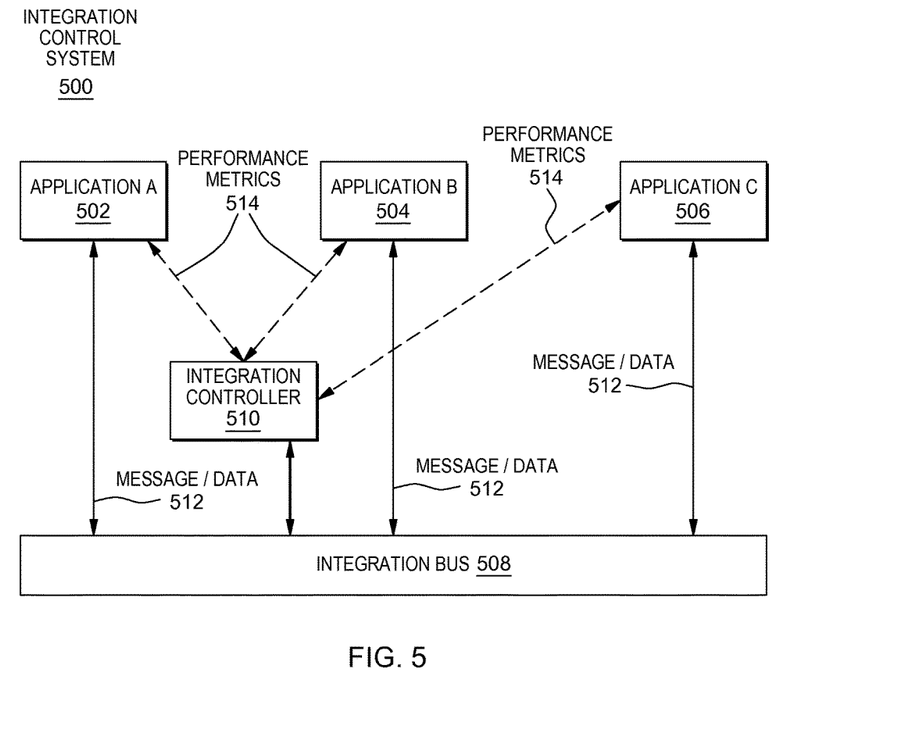
FIG. 5 is a block diagram of an embodiment using the integration control system of FIG. 3 in accordance with one embodiment of the disclosure.

With reference to FIG. 5 a block diagram of an embodiment using the integration control system of FIG. 3 in accordance with one embodiment of the disclosure is presented. Integration control system 500 in which the interplay involving integration bus 508 and integration controller 510 is depicted is a variant of integration control system 300 of FIG. 3.

Each of the applications (or components of applications) depicted as Application A 502, Application B 504 and Application C 506 communicate with one another (and other components or applications) using integration bus 508. Communication paths are represented as solid lines associated with labels of message/data 512. Although the communication paths are labeled with a same identifier the paths can carry different messages (commands, requests, responses) and data between integration bus 508 and one or more of the applications (or components of applications) as needed. Each of the paths represented by a communication path of message/data 512 represents one or more possible paths between integration bus 508 and a respective one of Application A 502, Application B 504 and Application C 506. For example message/data 512 between integration bus 508 and Application A 502 can be a single path or several paths as defined by the protocol linking between integration bus 508 and Application A 502 from among a set of protocols defined and accordingly supported within integration bus 508.

Integration controller 510 also communicates with each of Application A 502, Application B 504 and Application C 506 to receive performance metrics 514 in real time through a monitoring component of integration controller 510. Integration controller 510 maintains performance metrics 514 wherein maintaining includes processing options comprising coalescing, aggregation, reducing, or caching and leaving the performance metrics as raw data.

Integration controller 510 informs integration bus 508 of a result of processing the current set of performance metrics 514 in real time using one or more rules in a set of performance driven rules to obtain an action to pass along to integration bus 508. In response to a determination the current set of performance metrics 514 associated with a particular application is not within a predetermined tolerance for one or more particular performance metrics, integration bus 508 informs the particular application to perform the action specified by integration controller 510 as a result of using one or more rules in a set of performance driven rules.

In the event the current set of performance metrics 514 is determined to be within a predetermined tolerance for one or more particular performance metrics, integration controller 510 specifies no action. Integration controller 510 returns to monitor the applications and gather performance metrics 514 in real time.

In an illustrative practical example, an electronic commerce system comprising an electronic commerce Web site and back office fulfillment application receives orders submitted through the Web site, which are transferred to the fulfillment application. The Web site sells perishable goods, including flowers, so orders have to be fulfilled very quickly, and therefore the transfer from the Web site to the fulfillment application is performed in real time.

Processing at the Web site typically works well, however during a particular holiday, for example St. Valentines, so many orders are received that the fulfillment application cannot keep up. Processor utilization on back end machines reaches 100%, with memory consumption peaking as well, and very soon the fulfillment application crashes. Although the Web Site is operational, the Web site cannot transfer the orders to the fulfillment application and therefore cannot function, so the Web site fails as well. As a result the enterprise loses potential revenue.

For the next particular holiday, an embodiment of the disclosure is implemented. Using an embodiment of the disclosure, the Web Site and the fulfillment application communicate to each other through integration bus 508. A particular rule in a set of performance driven rules, such as set of rules 316 of FIG. 3, maintained by integration controller 510 rule is used to queue orders at integration bus 508 when the processor utilization on the fulfillment application machines exceeds 70% and only when the processor utilization drops is less than 70%, begin to process the orders from the queue.

In this variant of the example, even more orders than the holiday of the previous year are received, but because the load of the fulfillment application machines are now controlled using integration bus 508, the fulfillment application machines do not fail. As a result the whole system continues to operate as expected. Although fulfilling of the rush orders is delayed (because of the delay at the queue), the function of the whole system is maintained.

In another variant of the example for the next year, the Web site is enhanced to offer some items as super-rush, which requires delivery within 4 hours for example. To manage the new super-rush orders a corresponding rule is developed, which causes integration bus 508 to route the requests to the queue when the processor utilization on the fulfillment application machines exceeds 70% as before. However the orders for super-rush items are exempt from this rule and still go directly to the fulfillment application. Using an embodiment of the disclosure with the newly defined rule provides a capability to reduce the load on the fulfillment application while not losing or unnecessarily delaying the super-rush orders.

Figure 6:
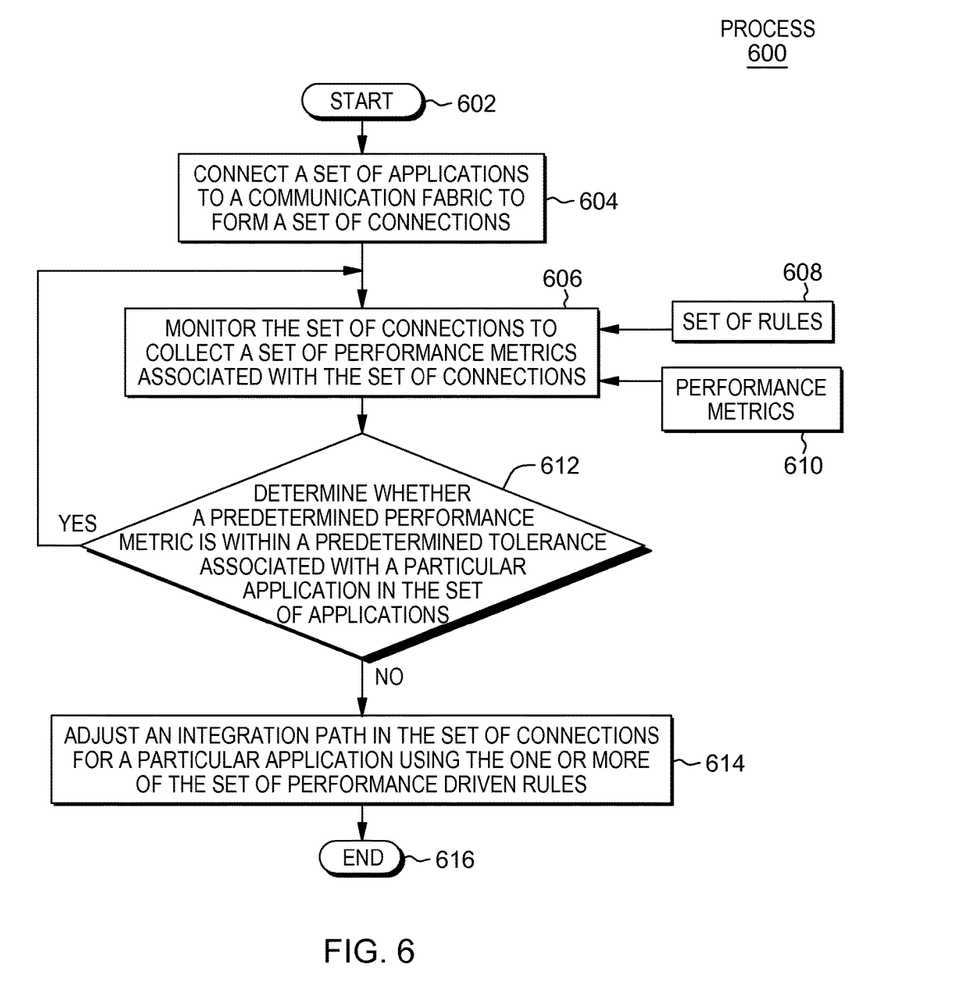
FIG. 6 is a flowchart of a process using the integration control system of FIG. 3 in accordance with an embodiment of the disclosure.

With reference to FIG. 6 a flowchart of a process using the integration control system of FIG. 3 in accordance with an embodiment of the disclosure is presented. Process 600 is a high level example of a process using the integration control system of FIG. 3.

Process 600 begins, (step 602) and connects a set of applications (or components of applications) to a communication fabric to form a set of connections. The connections enable communication between differing applications and components of the differing applications. The communication fabric further comprises a control mechanism in the form of integration bus 318 further comprising set of communication protocols 320 as in integration control system 300 of FIG. 3.

Process 600 monitors the set of connections using performance metrics associated with the set of applications (or components of applications) and one or more performance driven rules in a set of rules (step 606). The performance metrics associated with the set of applications (or components of applications) comprise utilization information regarding processing activity associated with the set of applications (or components of applications). For example, performance metrics may be collected and processed for processor utilization and memory utilization for a resource such as a server hosting one or more of the set of applications (or components of applications). In another example, performance metrics may be collected and processed for communication path utilization for a particular communication path between an integration bus and an application.

The monitor, in one embodiment of the disclosure functions as a component of an integration controller. The integration controller identifies one or more performance driven rule from a set of rules 608 which are performance driven using performance metrics 610. Performance metrics 610 are obtained by the monitoring component of the integration controller during monitoring activity associated with each of the set of applications (or components of applications).

Process 600 determines whether a predetermined performance metric is within a predetermined tolerance for a particular application, component of an application or path (step 612). In response to a determination the predetermined performance metric is within a predetermined tolerance for a particular application, component of an application or path, process 600 loops back to perform step 606 as before. In this case an integration controller has determined using the one or more of the set of performance driven rules in combination with the respective performance metrics obtained for the particular application, component of an application or path no further action is required. An indication of no further action required is passed to the integration bus.

In response to a determination the predetermined performance metric is not within an predetermined tolerance for a particular application, component of an application or path, process 600 adjusts an integration path in the set of connections for a particular application in the set of applications using the one or more of the set of performance driven rules in combination with the respective performance metrics obtained for the particular application, component of an application or path (step 614). Process 600 terminates thereafter (step 616).

Using an embodiment of process 600 as in the integration control system 300 of FIG. 3 accordingly enables a performance trigger to divert an integration from one route to another route dynamically using information (performance metrics) collected by an integration controller (processed with a set of rules) in conjunction with the integration bus which provides a communication fabric over which applications and components of applications converse.

Figure 7:
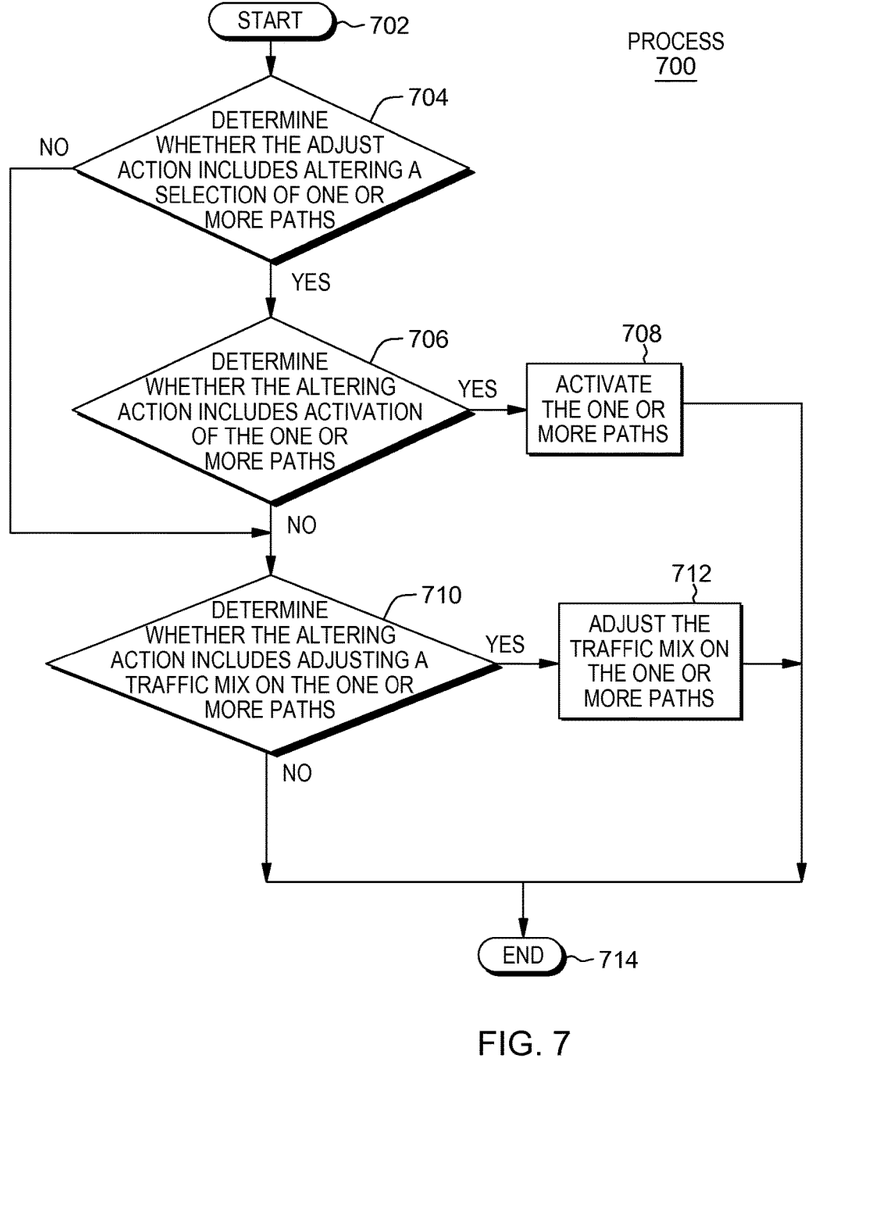
FIG. 7 is a flowchart of an adjustment sub-process within the process of using the integration control system of FIG. 6 in accordance with an embodiment of the disclosure.

With reference to FIG. 7 a flowchart of an adjustment sub-process within a process of using the integration control system of FIG. 3 in accordance with an embodiment of the disclosure is presented. Process 700 is one example of an adjustment sub-process within an adjustment portion (step 614) of process 600 of FIG. 6 using the integration control system 300 of FIG. 3.

Process 700 begins (step 702) and determines whether the adjust action includes altering a selection of one or more paths (step 704). The adjust action is a result of processing the performance metrics associated with a particular application, component of an application or path using one or more performance driven rules in a set of rules by an integration controller. In response to a determination the adjust action does not include altering a selection of one or more paths, process 700 skips ahead to perform step 710. In response to a determination the adjust action includes altering a selection of one or more paths, process 700 determines whether the altering action includes activation of one or more paths (step 706).

In response to a determination the altering action includes activation of one or more paths, process 700 activates the one or more paths (step 708) and terminates thereafter (step 714). In response to a determination the altering action does not include activation of one or more paths, process 700 determines whether the altering action includes adjusting a traffic mix on the one or more paths (step 710).

In response to a determination the altering action includes adjusting a traffic mix on the one or more paths, process 700 adjusts the traffic mix on the one or more paths (step 712), and terminates thereafter (step 714). In response to a determination the altering action does not include adjusting a traffic mix on the one or more paths, process 700 terminates thereafter (step 714).

Accordingly when viewed as a whole, process 600 of FIG. 6 and process 700 define a process for dynamic management of integration protocols. The combined process therefore when executed by one or more processors of a data processing system defines an embodiment of a process comprising linking performance metrics, including service definitions and quality of service for requests an application needs to process, to specific protocols and integration channels used to integrate the application with other components of a system. The process when executed by the one or more processors further connects applications and application components to a communication interconnect fabric to form a set of connections, wherein each of the applications and the application components are interconnected and each individual connection has a set of integration paths defined including a default path.

The process when further executed by the one or more processors monitors the set of connections using an integration controller, wherein the integration controller uses a set of rules, which are selectable and maintained in a repository of performance metric driven rules and measurement plugins associated with the integration controller. The process further determines whether a performance metric for a specific application is within a predefined tolerance and responsive to a determination that the performance metric for the specific application is not within the predefined tolerance, the integration controller instructs a change in integration paths wherein the change includes altering a selection of one or more paths including activation of one or more paths for the specific application and adjusting traffic mix on selected paths.

Thus is presented in an illustrative embodiment a computer-implemented process for dynamic management of integration protocols comprising connecting, by one or more processors executing computer executable program code stored within a memory connected to the one or more processors, a set of applications to a communication fabric to form a set of connections and monitoring the set of connections, by the one or more processors, to collect a set of performance metrics associated with the set of connections. The computer-implemented process further comprising determining, by the one or more processors, whether a predetermined performance metric is within a predetermined tolerance associated with a particular application in the set of applications and in response to a determination the predetermined performance metric is not within the predetermined tolerance associated with the particular application in the set of applications, by the one or more processors, adjusting an integration path in the set of connections for the particular application in the set of applications by programmatically using a set of rules wherein each rule in the set of rules is a performance driven rule.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer recordable data storage device having computer executable instructions comprising computer executable program code stored thereon in a variety of forms. Examples of computer recordable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented process for dynamic management of integration protocols, the computer-implemented process comprising:
   connecting, by one or more processors executing computer executable program code stored within a memory connected to the one or more processors, a set of applications to a communication fabric to form a set of connections;
   monitoring the set of connections, by the one or more processors, to collect a set of performance metrics associated with the set of connections;
   determining, by the one or more processors, whether a predetermined performance metric is within a predetermined tolerance associated for a particular application of the set of applications;
   in response to determining the predetermined performance metric is not within the predetermined tolerance associated with the particular application of the set of applications, by the one or more processors, adjusting a first integration path in the set of connections for a first portion of information passed to the particular application based on a set of rules to a queue, wherein each rule in the set of rules is a performance driven rule, and allowing a second portion of information passed to proceed to the particular application, and wherein the second portion of information comprises time-sensitive data;
   in response to determining a potential failure of the particular application based on the predetermined performance metric, adjusting a second integration path in the set of connections for a third portion of information passed to the particular application to an alternate application; and
   in response to determining that the predetermined performance method has returned to the predetermined tolerance associated with the particular application of the set of applications, by the one or more processors, performing a batch send of the queued information to the particular application.

2. The computer-implemented process of claim 1 further comprising adjusting an integration path in the set of connections for the particular application of the set of applications by programmatically using the set of rules wherein each rule in the set of rules is a performance driven rule further comprises:
   determining whether an adjust action includes altering a selection of one or more paths;
   in response to determining the adjust action includes altering a selection of one or more paths, determining whether the altering action includes activation of the one or more paths; and
   in response to determining the altering action includes activation of the one or more paths, activating the one or more paths.

3. The computer-implemented process of claim 2 wherein determining whether the altering action includes adjusting a traffic mix on the one or more paths further comprises:
   in response to determining the altering action includes adjusting a traffic mix on the one or more paths, adjusting the traffic mix on the one or more paths.

4. The computer-implemented process of claim 1 wherein the communication fabric comprises an integration bus and wherein the integration bus further comprises a set of communication protocols used by applications in the set of applications.

5. The computer-implemented process of claim 1 wherein determining, by the one or more processors, whether a predetermined performance metric is within a predetermined tolerance associated with a particular application of the set of applications further comprises:
   using the set of rules wherein each rule in the set of rules is a performance driven rule, wherein an integration controller maintains the set of rules, used in combination with one or more of the performance metrics obtained for the particular application of the set of applications.

6. The computer-implemented process of claim 1 wherein monitoring the set of connections, by the one or more processors, to collect a set of performance metrics associated with the set of connections further comprises:

caching the set of performance metrics for subsequent use with the set of rules.

7. The computer-implemented process of claim 1 wherein connecting, by one or more processors executing computer executable program code stored within a memory connected to the one or more processors, a set of applications to a communication fabric to form a set of connections further comprises:
   linking performance metrics in the set of performance metrics, including service definitions and quality of service for requests associated with an application of the set of applications, to specific protocols and integration channels used to integrate the application with other components of a system wherein each of the applications and application components are interconnected and each connection has a set of integration paths defined including a default path.

8. A computer program product for dynamic management of integration protocols, the computer program product comprising:
   one or more computer-readable storage devices and computer executable program code stored on at least one of the one or more computer-readable storage devices, the computer executable program code comprising:
   computer executable program code for connecting a set of applications to a communication fabric to form a set of connections;
   computer executable program code for monitoring the set of connections to collect a set of performance metrics associated with the set of connections;
   computer executable program code for determining, by one or more processors, whether a predetermined performance metric is within a predetermined tolerance associated with a particular application of the set of applications;
   computer executable program code in response to determining the predetermined performance metric is not within the predetermined tolerance associated with the particular application of the set of applications to adjust a first integration path in the set of connections for a first portion of information passed to the particular application based on a set of rules to a queue, wherein each rule in the set of rules is a performance driven rule, and a second portion of information passed proceeds to the particular application, and wherein the second portion of information comprises time-sensitive data;
   computer executable program code in response to determining a potential failure of the particular application based on the predetermined performance metric, adjusting a second integration path in the set of connections for a third portion of information passed to the particular application to an alternate application; and
   computer executable program code in response to determining that the predetermined performance method has returned to the predetermined tolerance associated with the particular application of the set of applications, by the one or more processors, performing a batch send of the queued information to the particular application.

9. The computer program product of claim 8 further comprising computer executable program code for adjusting an integration path in the set of connections for the particular application of the set of applications by programmatically using the set of rules wherein each rule in the set of rules is a performance driven rule further comprises:
   computer executable program code for determining whether an adjust action includes altering a selection of one or more paths;
   computer executable program code in response to determining the adjust action includes altering a selection of one or more paths, for determining whether the altering action includes activation of the one or more paths; and
   computer executable program code for in response to determining the altering action includes activation of the one or more paths, for activating the one or more paths.

10. The computer program product of claim 9, wherein determining whether the altering action includes adjusting a traffic mix on the one or more paths further comprises:
    in response to determining the altering action includes adjusting a traffic mix on the one or more paths, adjusting the traffic mix on the one or more paths.

11. The computer program product of claim 8, wherein the communication fabric comprises an integration bus and wherein the integration bus further comprises a set of communication protocols used by applications in the set of applications.

12. The computer program product of claim 8, wherein computer executable program code for determining, by the one or more processors, whether a predetermined performance metric is within a predetermined tolerance associated with a particular application of the set of applications further comprises:
    computer executable program code for using the set of rules wherein each rule in the set of rules is a performance driven rule, wherein an integration controller maintains the set of rules, used in combination with one or more of the performance metrics obtained for the particular application of the set of applications.

13. The computer program product of claim 8, wherein the computer executable program code for monitoring the set of connections, by the one or more processors, to collect a set of performance metrics associated with the set of connections further comprises:
    computer executable program code for caching the set of performance metrics for subsequent use with the set of rules.

14. The computer program product of claim 8, wherein the computer executable program code for connecting, by the one or more processors executing computer executable instructions stored within a memory connected to the one or more processors, a set of applications to a communication fabric to form a set of connections further comprises:
    linking performance metrics in the set of performance metrics, including service definitions and quality of service for requests associated with an application of the set of applications, to specific protocols and integration channels used to integrate the application with other components of a system wherein each of the applications and application components are interconnected and each connection has a set of integration paths defined including a default path.

15. An apparatus for dynamic management of integration protocols, the apparatus comprising:
    a communications fabric;
    a memory connected to the communications fabric, wherein the memory contains computer executable program code;
    a communications unit connected to the communications fabric;
    and
    a processor unit connected to the communications fabric, wherein the processor unit executes the computer executable program code to direct the apparatus to:

connect a set of applications using the communications fabric to form a set of connections;

monitor the set of connections to collect a set of performance metrics associated with the set of connections;

determine whether a predetermined performance metric is within a predetermined tolerance associated with a particular application of the set of applications;

in response to determining the predetermined performance metric is not within the predetermined tolerance associated with the particular application of the set of applications adjust a first integration path in the set of connections for a first portion of information passed to the particular application based on a set of rules to a queue, wherein each rule in the set of rules is a performance driven rule, and a second portion of information passed proceeds to the particular application, and wherein the second portion of information comprises time-sensitive data;

in response to determining a potential failure of the particular application based on the predetermined performance metric, adjusting a second integration path in the set of connections for a third portion of information passed to the particular application to an alternate application; and in response to determining that the predetermined performance method has returned to the predetermined tolerance associated with the particular application of the set of applications, by the one or more processors, performing a batch send of the queued information to the particular application.

16. The apparatus of claim 15 further comprising computer executable program code to adjust an integration path in the set of connections for the particular application of the set of applications by programmatically using the set of rules wherein each rule in the set of rules is a performance driven rule further directs the apparatus to:

determine whether an adjust action includes altering a selection of one or more paths;

in response to determining the adjust action includes altering a selection of one or more paths, determine whether the altering action includes activation of the one or more paths; and in response to determining the altering action includes activation of the one or more paths, activate the one or more paths.

17. The apparatus of claim 16 wherein the processor unit executes the computer executable program code in response to determining the altering action does not include activation of the one or more paths, further directs the apparatus to determine whether the altering action includes adjusting a traffic mix on the one or more paths; and in response to determining the altering action includes adjusting a traffic mix on the one or more paths, adjust the traffic mix on the one or more paths.

18. The apparatus of claim 15 wherein the communication fabric comprises an integration bus and wherein the integration bus further comprises a set of communication protocols used by applications in the set of applications.

19. The apparatus of claim 15 wherein the processor unit executes the computer executable program code to determine whether a predetermined performance metric is within a predetermined tolerance associated with a particular application of the set of applications further directs the apparatus to:

use the set of rules wherein each rule in the set of rules is a performance driven rule, wherein an integration controller maintains the set of rules, used in combination with one or more of the performance metrics obtained for the particular application of the set of applications.

20. The apparatus of claim 15 wherein the processor unit executes the computer executable program code to connect a set of applications to a communication fabric to form a set of connections further directs the apparatus to:

link performance metrics in the set of performance metrics, including service definitions and quality of service for requests associated with an application of the set of applications, to specific protocols and integration channels used to integrate the application with other components of a system wherein each of the applications and application components are interconnected and each connection has a set of integration paths defined including a default path.

* * * * *